US008353309B1

(12) United States Patent
Embry et al.

(10) Patent No.: US 8,353,309 B1
(45) Date of Patent: Jan. 15, 2013

(54) HYDRANT LOCK

(76) Inventors: Joel Embry, Borden, IN (US); King Embry, Winnetka, IL (US)

( * ) Notice: Subject to any disclaimer, the term of this patent is extended or adjusted under 35 U.S.C. 154(b) by 466 days.

(21) Appl. No.: 12/761,814

(22) Filed: Apr. 16, 2010

(51) Int. Cl.
*F16K 35/00* (2006.01)
*F16K 35/10* (2006.01)
*G05G 5/00* (2006.01)
*B65D 55/02* (2006.01)
*G08B 21/00* (2006.01)

(52) U.S. Cl. .......... 137/385; 137/382; 137/383; 70/174; 70/175; 70/176; 70/177; 70/178; 70/180; 70/158; 70/163; 70/164; 70/165; 70/229; 340/540

(58) Field of Classification Search .............. 137/382, 137/383, 384, 385; 70/174–178, 180, 158, 70/163–166, 229, 230, 232; 340/540
See application file for complete search history.

(56) References Cited

U.S. PATENT DOCUMENTS

| | | | | |
|---|---|---|---|---|
| 1,947,081 | A * | 2/1934 | Grady et al. ............ | 70/178 |
| 3,185,336 | A | 5/1965 | Goss | |
| 4,620,428 | A * | 11/1986 | Kopesky ................ | 70/175 |
| 4,723,569 | A * | 2/1988 | Ellis .................... | 137/385 |
| 5,238,141 | A | 8/1993 | Callegari et al. | |
| 5,464,114 | A * | 11/1995 | Green .................... | 220/284 |
| 5,632,301 | A | 5/1997 | Julicher | |
| 6,463,953 | B1 | 10/2002 | Cuzzo et al. | |
| 6,612,455 | B2 | 9/2003 | Byrne | |
| 6,691,732 | B2 | 2/2004 | Fleury, Jr. et al. | |
| 6,802,338 | B1 * | 10/2004 | Istre, Jr. ................ | 137/383 |
| 6,816,072 | B2 * | 11/2004 | Zoratti ................. | 340/540 |
| 6,994,106 | B1 * | 2/2006 | Hackley et al. ......... | 137/385 |
| 7,084,809 | B2 | 8/2006 | Hockley, Jr. et al. | |
| 7,113,124 | B2 | 9/2006 | Waite | |
| 7,508,840 | B2 | 3/2009 | Delaney | |
| 7,597,113 | B2 | 10/2009 | Garcia et al. | |
| 2004/0129312 | A1 | 7/2004 | Cuzzo et al. | |
| 2005/0104747 | A1 | 5/2005 | Silic et al. | |
| 2005/0265256 | A1 | 12/2005 | Delaney | |
| 2009/0116509 | A1 | 5/2009 | Delaney | |
| 2009/0174547 | A1 | 7/2009 | Greene et al. | |
| 2009/0198384 | A1 | 8/2009 | Ahn | |
| 2009/0207852 | A1 | 8/2009 | Greene et al. | |

FOREIGN PATENT DOCUMENTS

JP 08299030 5/1998

* cited by examiner

*Primary Examiner* — John K Fristoe, Jr.
*Assistant Examiner* — Daphne M Barry
(74) *Attorney, Agent, or Firm* — Middleton Reutlinger; Chad D. Bruggeman; John F. Salazar

(57) ABSTRACT

A hydrant locking device inhibiting unauthorized operation of a fire hydrant and includes a flip-top lid positioning between an open configuration and a closed configuration relative to a base. The flip-top lid is hingedly connected to the base of the locking device. The base may be releasably secured to an operating nut of the fire hydrant or more specifically an operating nut extension that engages the operating nut of the fire hydrant. The flip-top lid may also include a sealed cavity that may include electronics. These electronics may be in electrical communication with a wireless mesh network.

22 Claims, 6 Drawing Sheets

HYDRANT LOCK

TECHNICAL FIELD

The present invention relates to a locking device and particularly to a locking device to inhibit unauthorized operation of a fire hydrant.

DETAILED DESCRIPTION

Figure 1:
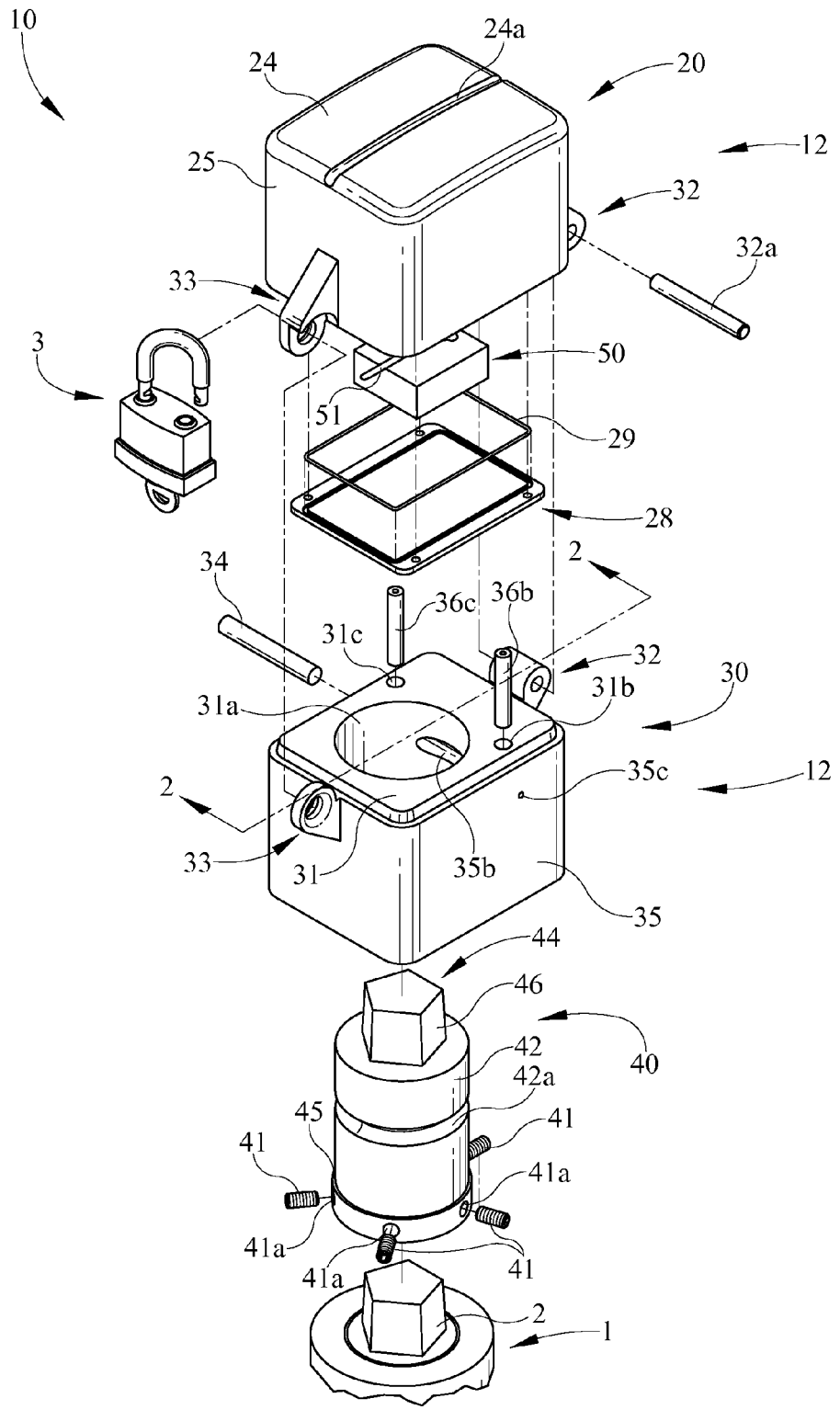
FIG. 1 is an exploded, perspective view of one embodiment of the locking device exploded away from the hydrant operating nut of the fire hydrant with portions of the fire hydrant broken away.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

As shown in FIGS. 1-5, one embodiment of a hydrant locking device 10 inhibits unauthorized operation of a fire hydrant 1. Fire hydrant 1 includes an actuating or operating nut 2 positioned at an upper end of the fire hydrant. Previous locking devices are designed to mount on a hydrant's operating nut only to secure an individual hydrant from unauthorized use by preventing access to the operating nut. If the previous locking device is breached, only a physical inspection of the hydrant would determine that tampering has occurred. The present embodiments provide, but is not limited to, a lockable housing to identify tampering and prevent unauthorized use of the fire hydrant, hands free operation of the operating nut when the housing is in an open configuration, and electronics to allow the sensing and/or the transmitting of a variety of information, such as but not limited to unauthorized use, to a remote location or internally within the housing of the hydrant locking device.

Figure 4:
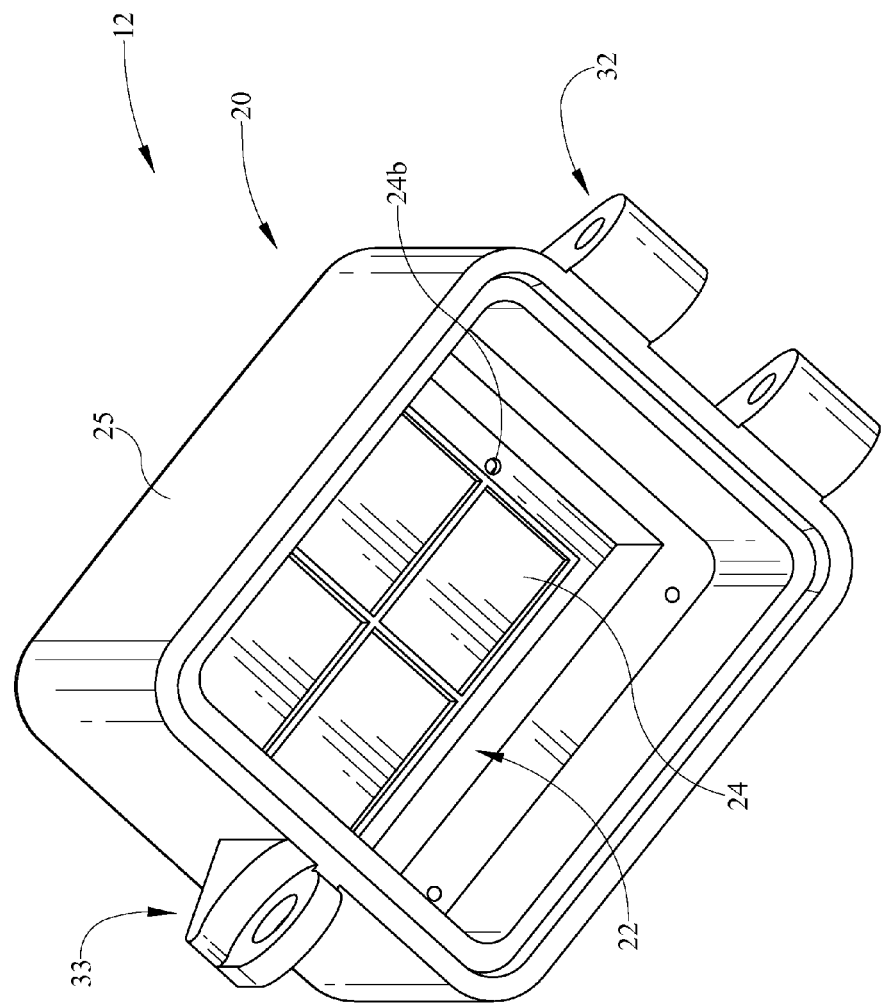
FIG. 4 is a bottom perspective view of the flip-top lid of the locking device embodiment of FIG. 1.
Figure 5:
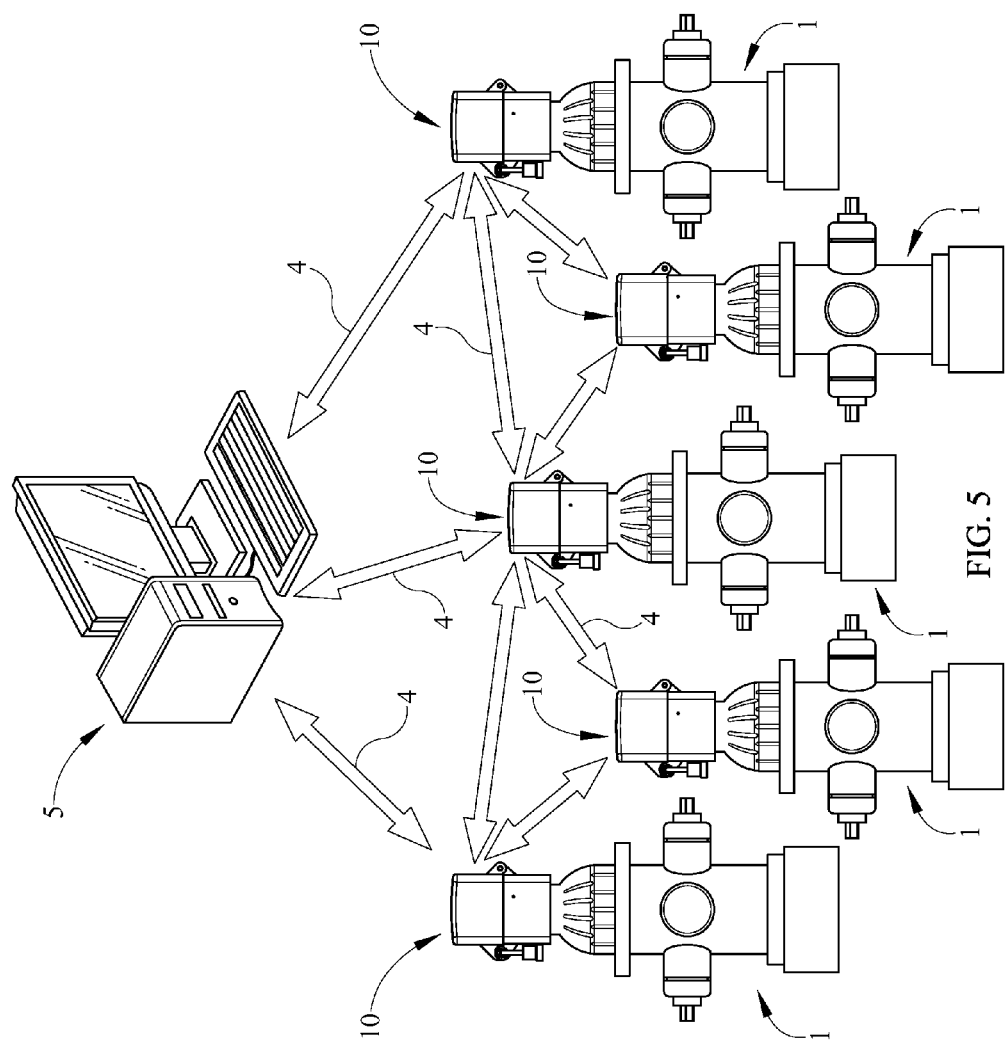
FIG. 5 is an illustration of a hydrant network system with the locking device embodiment of FIG. 1 as the nodes making up the mesh network.

As shown in FIGS. 1-5, a flip-top housing 12 of the hydrant locking device 10 engages a fire hydrant 1 or more specifically the operating nut 2 of the fire hydrant. Flip-top housing 12 includes a housing base or body portion 30 and a lid or cover 20. Housing 12 may be made of a variety of materials including but not limited to cast iron or ductile iron. Lid 20 is hingedly connected to base 30. A hinge 32 accommodates movement of lid 20 from a closed position (FIG. 5) to an open position (FIG. 2) about hinge pin 32a while maintaining the attachment of lid 20 to base 30. Hinge 32 may allow for the opening of lid 20 by a variety of means known in the art including but not limited to a two piece flip-top housing. Hinge 32 may also be bimodal wherein the hinge snaps lid 20 to either a fully open position (FIG. 2) or a fully closed position (FIG. 5). Alternatively, the hinge can be a living hinge type. A padlock hasp 33 may be positioned opposite hinge 32 to receive a padlock 3 to lock the flip-top housing 12 in its closed position (FIG. 5). Hasp 33 receives padlocks with a full U-shaped shackle or a high security padlock with shrouded shackle. The hasp design has minimal material exposed to limit an unauthorized user's ability to cut it with bolt cutters or a hack saw.

Figure 2:
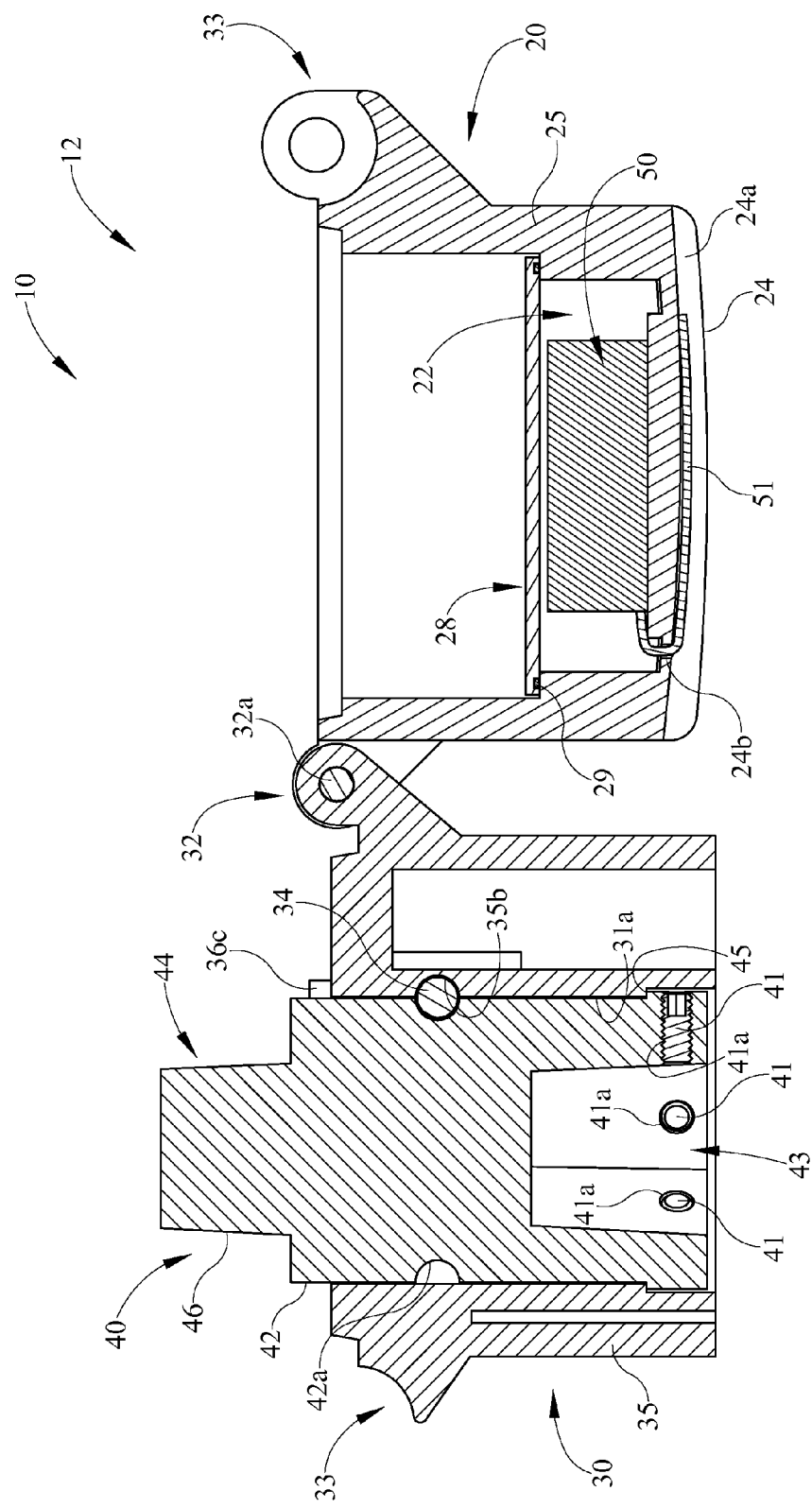
FIG. 2 is a sectional view of the embodiment of FIG. 1 in an open configuration taken along line 2-2.
Figure 3:
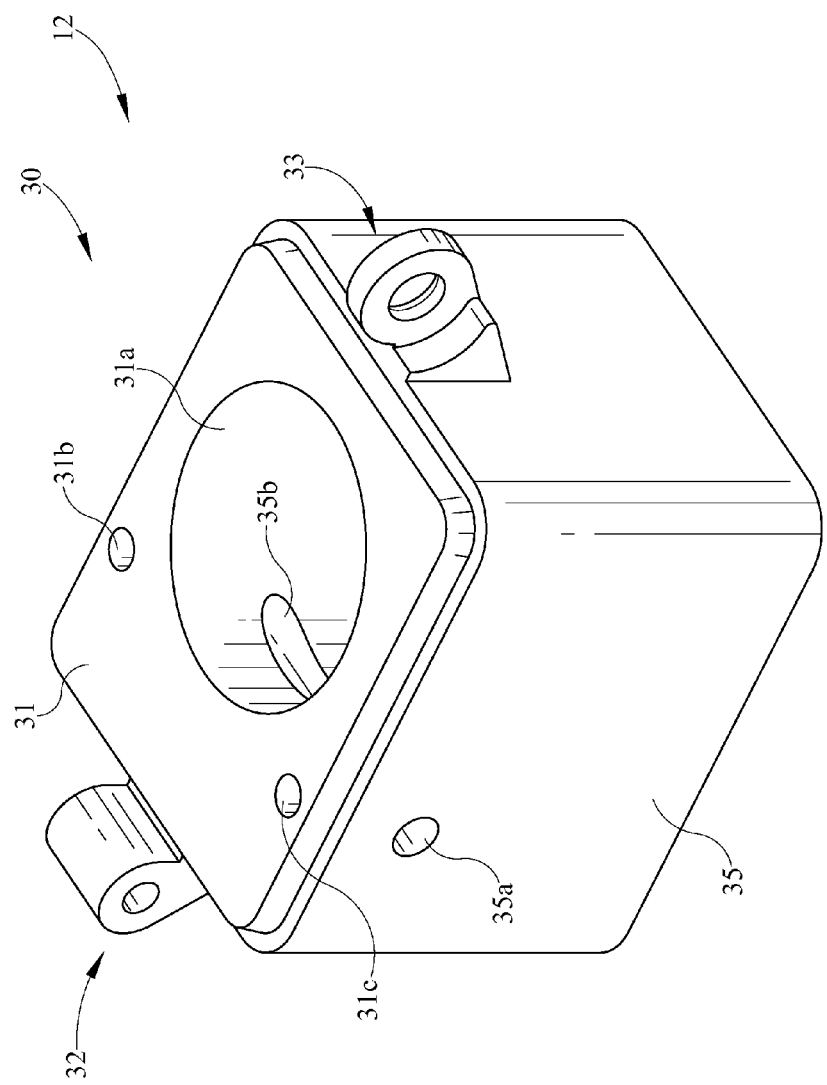
FIG. 3 is a top perspective view of the base of the locking device embodiment of FIG. 1.

As shown in FIGS. 1 and 2, an extension 40 has a cylindrical shaped body formed with a downward facing, inner opening 43. Extension 40 may be made of a variety of materials including but not limited to cast iron or ductile iron. Inner opening 43 is pentagonal in shape and includes five sides matching the shape of the fire hydrant operating nut 2. It should be understood that fire hydrants 1 may have a variety of different shaped operating nuts 2, such as but not limited to square shaped, and thus the extension 40 can be shaped accordingly to a complementary shape matching the hydrant operating nut. The upper end of extension 40 includes a pentagonal shape actuator nut 44 having slightly inward tapering sides 46. In a cylindrical sidewall 42 of extension 40 is a horizontally positioned, arcuate shaped groove 42a. Below this groove 42a is a set of radially spaced apart, horizontally positioned threaded bores 41a. Extension 40 may have up to five bores 41a or an amount equal to the number of sides defining the extension inner opening 43. Bores 41a intersect respectively with the extension inner opening's sides at their midpoints. Disposed in each threaded bore 41a is a set screw 41. In use, hydrant operating nut 2 is received into inner opening 43 of extension 40, thereby set screws 41 are tightened into a compressive engagement against the sides of the hydrant operating nut.

As shown in FIGS. 1-3 and 5, closure base 30 may be characterized as having or defining a wall or skirt 35 for removably (FIGS. 1 and 2) or non-removably (not shown) receiving extension 40 or fire hydrant 1. Skirt 35 depends downwardly from a top wall 31. Top wall 31 includes a cylindrical shaped, inner opening 31a. Inner opening 31a is sized to receive extension 40 and allows longitudinal movement between the extension 40 and the housing base 30 while limiting lateral movement. Base 30 is fitted onto and rests on a shoulder 45 at the lower end of the extension 40. As now located, base skirt opening 35a is aligned with the extension groove 42a. Base 30 is then secured to extension 40 by a locking pin 34 extending through base skirt opening 35a of skirt 35 and engaging extension groove 42a, thereby allowing rotation of the flip-top housing 12 but preventing axially movement. Specifically, base skirt opening 35a intersects tangentially with base inner opening 31a to form a horizontally positioned, arcuate shaped slot 35b in the sidewall of the inner opening 31a to receive locking pin 34. Further, one or more vertical openings 31b and 31c are positioned perpendicularly to base top wall 31 and through base skirt opening 35a. Installation of locking pin 34 may include a first stop pin 36b inserted into vertical opening 31b opposite the entry to the base skirt opening 35a. Next, locking pin 34 is horizontal inserted into opening 35a of base skirt 35 until locking pin 34 abuts against the previously inserted first stop pin 36b. Finally, the user inserts the second stop pin 36c into opening 31c at the other end of the previously inserted locking pin 34. In the locked positioned, locking pin 34 extends through base skirt opening 35a and extension groove 42a with a stop pin 36b and 36c vertically positioned in each of the vertical openings 31b and 31c, respectively, of base top wall 31 at opposing ends of the locking pin preventing lateral removal of the locking pin. To remove locking pin 34, the user would remove both stop pins 36b and 36c and push out locking pin 34 when lid 20 is in the open position (FIG. 2). Locking pin 34 may be pushed out of base 30 with a nail or small screw driver through a small hole or opening 35c through skirt 35 at the axial end of the base skirt opening 35a. However, it should be understood that the stop pins 36b and 36c could be used to push out locking pin 34 if the base skirt opening 35a extended continuously through the base skirt. The locking pin 34 and stop pins 36b and 36c may be made of a variety of materials including but not limited to stainless steel. For instance, stop pins 36b and 36c may be standard hex key wrenches (Allen Wrenches) that can also be used to tighten the set screws 41 into the compressive engagement against the sides of the hydrant operating nut 2 to secure the extension 40. Although the engagement between housing base 30 and extension 40 is shown in detail in FIGS. 1, 2, and 3, it is merely representative of engagements in general, and it is to be understood that there are a variety of attachment mechanisms that may be used with the housing 12 herein. For example, a C-shaped locking pin may slide into two horizontal openings of the base skirt and engage the extension groove at two positions 180 degrees apart while still allowing rotation of the housing and preventing axially movement of the housing.

Figure 6:
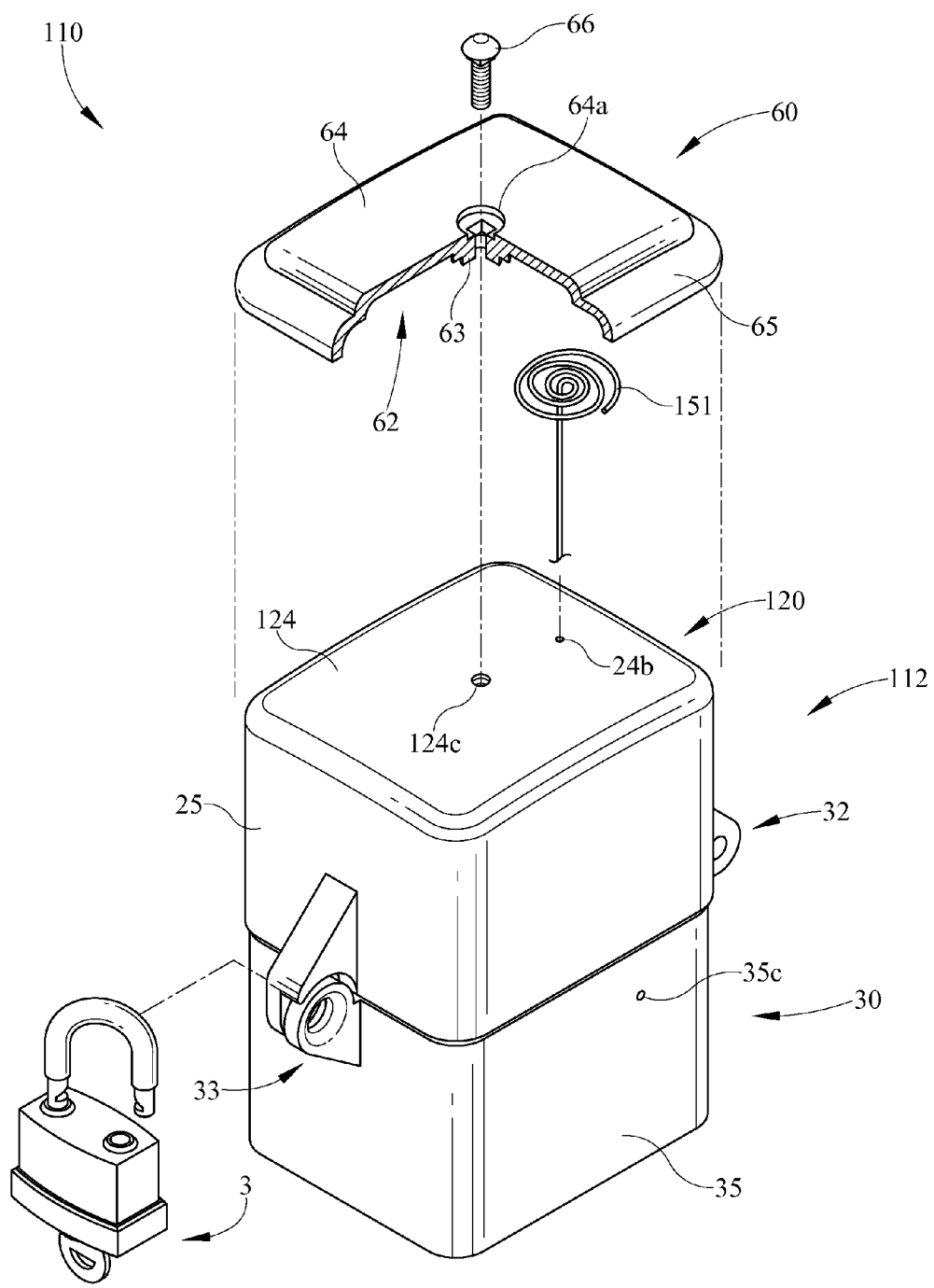
FIG. 6 is an exploded, perspective view of another embodiment of a locking device with a cover and an aerial wire exploded away therefrom and portions of the cover broken away.

As shown in FIGS. 1, 2, and 4, hinged lid 20 may include one or more cavities 22 to hold a variety of devices such as, but is not limited to, one or more electronics 50. Lid 20 includes a top wall 24 with a depending skirt or wall 25 defining at least one cavity 22. Cavity 22 may include a variety of electronics 50 including but not limited to transmitters, accelerometers, transceivers, sensors, or combinations thereof. A cover plate 28 and gasket 29 may seal cavity 22 and create a sealed compartment sealing the electronics 50 or other devices within flip-top housing 12. Although, gasket 29 and cover plate 28 may be used to seal cavity 22 from water, dirt, or other such undesirable elements, it should be understood that a variety of other sealing methods may be used such as, but not limited to, sealed or water proof electronics or the entire cavity 22 being filled or encapsulated with a sealant material. Top wall 24 may include a groove 24a that may contain an aerial wire 51 extending from cavity 22 through an opening 24b of lid top wall 24. As shown in FIG. 6, the top wall of the lid may be without a groove. A sealant or other material (not shown) may also be used to seal opening 24b, seal about aerial wire 51 in opening 24b, maintain the position of aerial wire 51 within top wall groove 24a, or combinations thereof. In use, a transmitter of electronics 50 will be activated when the lockable lid 20 of housing 12 is opened (FIG. 2) and/or via a separate sensor, for example for nuclear materials, water pressure, water temperature, chemicals, etc. It is further understood, that the flip-top housing 12 may be used initially to lockably inhibit unauthorized operation of the fire hydrant without electronics 50 installed and allow a user to add electronics 50 or other devices later if desired within the lid cavity 22.

As shown in FIG. 5, each flip-top housing 12 may include electronics 50 to allow for a "mesh based sensor network" utilizing fire hydrants 1 for the placement of network nodes. A wireless mesh network (WMN) is a communications network made up of radio nodes organized in a mesh topology. Wireless mesh networks often consist of mesh clients, mesh routers and gateways. The mesh clients are often laptops/computers 5, cell phones and other wireless devices while the mesh routers forward traffic to and from the gateways which may but need not connect to the Internet. The coverage area of the radio nodes working as a single network is sometimes called a mesh cloud. Access to this mesh cloud is dependent on radio nodes or the hydrant locking devices 10 working in harmony with each other to create a radio network. A mesh network is reliable and offers redundancy. When one node can no longer operate, the rest of the nodes can still communicate 4 with each other, directly or through one or more intermediate nodes. Wireless mesh networks can be implemented with various wireless technology including 2.4, 802.11, 802.16, cellular technologies or combinations of more than one type. This "Hydrant Network System" includes fire hydrant mounted nodes or hydrant locking devices 10 that make up the mesh network "cloud". The placement of hydrant locking devices 10 with each fire hydrant 1 throughout a water district provides an ideal topography with the average distance of 300 to 600 feet between hydrants in most metropolitan areas. The Hydrant Network System and associated sensors are monitored from a PC based application that presents a "dashboard" showing the real time status of all sensors connected to the "Hydrant Based Network". For example in use, an accelerometer within housing lid electronics 50 in locking device 10 communicates 4 in the mesh network system to signal that unauthorized use has occurred when a lid 20 pivots to a predetermined angle about hinge 32 relative to base 30.

As shown in FIG. 2, the flip-top lid 20 or base 30 of the flip-top housing 12 does not have to be completely removed from fire hydrant 1 or extension 40 to operate the hydrant nut 2 of the fire hydrant 1. The lid 20 is opened upon unlocking the lid or removing the padlock 3 from the hasp 33. Once the lid is opened to, but is not limited to, 180 degrees this allows the user full access to extension 40 or hydrant operating nut 2 with a hydrant wrench or other tool to operate the hydrant and allows the user hands free operation of the hydrant operating nut. Additionally when lid 20 is in the open position (FIG. 2), the sealed or unsealed cavity 22 is accessible to operate, replace, add, or repair electronics or other devices contained therein. Also, the locking pin 34 that is releasably securing the base 30 or housing 12 to the fire hydrant 1 or extension 40 is accessible when the lid 20 is in the open position (FIG. 2). Therefore, any unauthorized user is unable to operate the hydrant, access the electronics, and to remove the locking pin or base from the hydrant when the lid is in a locked closed position (FIG. 5).

As shown in FIG. 6, another embodiment of a locking device 110 includes a flip-top housing 112 having a lid 120 hingedly connected to base 30 as described above. However, lid 120 may include a cover 60 attached thereto. Cover 60 includes a top wall 64 with an outer depending skirt 65, whereby the skirt conforms to the outer periphery or exterior surface of the top wall 124 or lid 120. Cover 60 may be made of a variety of materials including but not limited to plastic, that may be injected or compression molded. When connected to the lid 120, cover 60 creates a compartment 62, sealed or unsealed, that may include, but is not limited to, an aerial wire 151 or other electrical devices. Cover 60 permits an aerial wire 151 of various sizes or configurations depending on the particular transmitter device selected. A carriage bolt 66 and nut (not shown) combination may connect the cover to the lid, however, it should be understood that other attachment mechanisms may be used such as, but not limited to, adhesives or other mechanical attachments. Carriage bolt 66 extends through the lid through opening 124c and engages the internally positioned nut (not shown). A spacer or projection 63 may depend from top wall 64 of cover 60 to maintain the compartment 62 size or spacing between cover 60 and lid top wall 124 to reduce depression of the cover caused from overtightening of the carriage bolt 66. Spacer 63 is shown as being adjacent to and surrounding the opening 64a that receives carriage bolt 66. Also, it should be understood that the cover 60 may be a variety of sizes, construction, shapes, quantities, and positions in relationship with its engagement with the lid or base.

It is understood that while certain embodiments of the invention have been illustrated and described, it is not limited thereto except insofar as such limitations are included in the following claims and allowable functional equivalents thereof.

We claim:

1. A fire hydrant locking device for use on a hydrant operating nut comprising:
    an extension operably engaging a hydrant operating nut of a fire hydrant;
    a housing having a lid hingedly connected to a base, said lid having a top wall and a depending skirt;
    said base having a top wall and a depending skirt, said top wall having a first opening and a second opening, said top wall first opening receives said extension, said base skirt having a third opening;
    a locking pin positionable within said base skirt third opening and in an interference relationship with said extension;
    at least one pin positionable within said base top wall second opening retaining said locking pin in said interference relationship with said extension; and
    said lid positionable about a hinge between an open configuration and a closed configuration relative to said base, said lid is closed upon said base when said lid is in said closed configuration, and said extension is accessible when said lid is in said open configuration.

2. The fire hydrant locking device as in claim 1 wherein said base is at least vertically restricted relative to a fire hydrant.

3. The fire hydrant locking device as in claim 1 further including a pair of said at least one pins retaining said locking pin.

4. The fire hydrant locking device as in claim 1 wherein said at least one pin is secured into said base top wall second opening of said housing when said lid is in said open position.

5. The fire hydrant locking device as in claim 1 wherein said housing includes electronics.

6. The fire hydrant locking device as in claim 5 wherein said electronics are positioned in a cavity within said lid of said housing.

7. The fire hydrant locking device as in claim 6 further including a cover plate sealingly engaging said cavity of said housing lid.

8. The fire hydrant locking device as in claim 5 wherein said electronics of said housing are part of a mesh network.

9. The fire hydrant locking device as in claim 1 further including a cover engaging an exterior surface of said lid and creating a compartment between said cover and said lid.

10. A fire hydrant locking device comprising:
    an extension operably engaging a hydrant operating nut of a fire hydrant;
    a housing having a lid hingedly connected to a body, said body having an outer skirt and a body top wall, said body top wall having a first axial opening and a second axial opening, said first axial opening receiving said extension therethrough, said body skirt having an opening perpendicular to and intersecting said first axial opening of said body top wall;
    at least one locking pin receivable within said body skirt opening, said at least one locking pin in an interference relationship with said extension;
    at least one retaining pin is received within said second axial opening of said body top wall and laterally retains said at least one locking pin in said interference relationship with said extension; and
    said lid pivotally connected to said body, said lid having an annular wall depending from a top wall, wherein said extension and said at least one retaining pin are each accessible when said lid is in an open position relative to said body and inaccessible to operate when said lid is in a closed position relative to said body.

11. The fire hydrant locking device as in claim 10 wherein said at least one retaining pin abuts against a distal end of said at least one locking pin when inserted within said second axial opening of said body top wall.

12. The fire hydrant locking device as in claim 10 wherein said lid includes a sealed cavity.

13. The fire hydrant locking device as in claim 10 further including one or more electronic devices within said housing.

14. The fire hydrant locking device as in claim 13 wherein said lid includes one or more internal cavities, wherein said one or more electronic devices are positioned within said one or more internal cavities of said lid.

15. The fire hydrant locking device as in claim 14 further including a cover plate sealingly engaging said one or more internal cavities creating at least one sealed compartment.

16. The fire hydrant locking device as in claim 10 further including a cover encompassing an external compartment of said lid.

17. A fire hydrant locking device comprising:
    an extension operably engaging a hydrant operating nut of a fire hydrant;
    a housing having a lid hingedly connected to a base;
    said base having a top wall with a depending wall, said base is releasably secured to said extension by at least one locking pin; said top wall of said base includes at least one axial opening receiving at least one retaining member, said at least one retaining member restricts lateral movement of said at least one locking pin;
    said lid having a top wall with a depending skirt defining an internal cavity, said internal cavity has a sealed compartment;
    one or more electronic devices positioned within said sealed compartment within said lid; and
    said lid positionable about a hinge between an open configuration and a closed configuration, said lid is closed upon said base when said lid is in said closed configuration, and said extension is accessible when said lid is in said open configuration.

18. The fire hydrant locking device as in claim 17 wherein said one or more electronic devices are accessible when said lid is in said open position relative to said base.

19. The fire hydrant locking device as in claim 17 wherein said one or more electronic devices includes a transmitter, accelerometer, transceiver, sensor, or combinations thereof.

20. The fire hydrant locking device as in claim 17 further including an aerial wire in electrical connection with said one or more electronic devices, wherein said aerial wire extends through said lid.

21. The fire hydrant locking device as in claim 20 further including a cover engaging an exterior surface of said lid and creating a compartment for positioning said aerial wire outside said lid.

22. The fire hydrant locking device as in claim 17 wherein said one or more electronic devices within said sealed compartment are part of a wireless mesh network.

* * * * *